3,329,705
THE USE OF GROUP VIII NOBLE METALS IN THE PURIFICATION OF PHTHALIC ACID ESTERS
Carl E. Johnson, Griffith, Ind., assignor to Standard Oil Company, Chicago, Ill., a corporation of Indiana
No Drawing. Filed Mar. 29, 1963, Ser. No. 269,146
11 Claims. (Cl. 260—475)

This invention relates to benzene carboxylic acid esters. More particularly, the invention relates to a process for improving the acid-number stability of lower alkanol esters of phthalic acids.

The esters to which this application relates may be prepared by reacting a lower alkanol with a phthalic acid. They are useful as plasticizers for a variety of rubbers and plastics, and, particularly terephthalic acid, as intermediates for polyester films or fibers, a use for which it is necessary that the esters be of extremely high purity— on the order of 99.9% or greater.

It has now been discovered that the acid-number stability of lower alkanol esters of phthalic acids can be considerably improved by contacting the esters with a noble metal.

The noble metal contacting process may be applied to esters derived from the reaction of phthalic acids with lower alkanols having from one to eight carbon atoms. Methanol, ethanol, propanol, butanol, pentanol, hexanol, heptanol or octanol and their alkyl-substituted derivatives are illustrative alkanols. It is particularly advantageous to apply the purification process to dimethyl terephthalate or dimethyl isophthalate.

The noble metal is selected from the platinum group of the periodic system, i.e., palladium, ruthenium, platinum, rhodium, osmium and iridium. The noble metal can be employed in bulk form, for example, as a screen or in particulate form, or it may be dispersed in the form of a film or fine particles upon a solid support. In a preferred embodiment of this invention the noble metal is finely divided and dispersed upon an activated carbon support. The concentration of noble metal upon the support is not critical within rather wide limits ranging from as low as 0.01 to 5 or 10 percent by weight of noble metal based on the total weight of the noble metal plus the support.

Various supports may be used for the noble metal, such as activated charcoal, alumina, silica-alumina, and kieselguhr. Porous charcoal made from vegetable matter is advantageously used. When referring herein to alumina as a support for the noble metal, reference is made to the high surface area, substantially anhydrous calcined aluminas of the gamma-type described in the Aluminum Company of America's Technical Bulletin No. 10, "Alumina Properties" (Editions of 1953, 1956 and 1960). Reference is also made to Kirk-Othmer's "Encyclopedia of Chemical Technology" under appropriate headings such as Catalysts, Platinum Metals and Activated Carbon, Berkman et al. "Catalysis" (Rheinhold Publishing Corporation, 1940), with particular reference to Chapters 4, 7 and 10, and such specific references to the use of noble metal catalysts as U.S. patent No. 3,007,941, and Hawthorne et al. note appearing in J. Organic Chemistry, 25, pages 2215–16 (December, 1960).

It is advantageous to carry out the noble metal contacting process in the liquid phase in order to promote intimate contact between the noble metal and the ester being purified. For example, the ester can be contacted in the molten state. In one preferred embodiment of the invention, crude dimethyl phthalate is crystallized from hot methanolic esterification reactor solution by cooling. The crystals are separated, conveniently by filtration, centrifugation or the like, and melted. The molten crude ester is then contacted with a noble metal, such as palladium, dispersed upon a solid support, for example, an activated carbon or porous gamma-type alumina support. The contacting is accomplished either by percolating the molten ester through a fixed bed of the supported noble metal or by passing it through a porous cartridge of the contacting agent disposed in a pipe. Space velocity of the ester through such a bed or cartridge should be in the range of from 0.004 to 60 pounds of ester per minute per pound of noble metal contacting agent.

In another advantageous embodiment of the invention the molten crude ester is contacted in the bottom of the crude ester distillation column during an equilibration period at total reflux, advantageously at less than atmospheric pressure. The contacting process may be accomplished either by admixing the contacting agent with the molten crude ester in the bottom of the column or the contacting agent may be suspended in the bottom of the column in a basket.

In still another embodiment of the invention a solution of the ester can be contacted with the noble metal. For example, the alcoholic esterification reactor effluent solution of the ester may be contacted by percolation through a fixed porous bed of the noble metal, preferably dispersed on a support. Although the temperature of the operation may vary widely, in the range of from about 25° C. to 250° C., sufficient pressure should be maintained to assure that the alcohol is kept in the liquid phase.

The improvement in the acid-number stability of esters treated by the process of this invention is measured by periodically determining the acid-number of a sample of the ester which has been maintained in the molten state at 150° C. under an inert gas blanket containing 0.5% oxygen. Acid number is expressed as milligrams of KOH, per gram of ester, necessary for neutralization, as determined photometrically using KOH dissolved in a solution of dimethyl formamide and toluene (in 3:1 ratio) and a brom-thymol blue indicator.

The new process yields dimethyl terephthalate which exhibits stable acid-numbers of less than 0.05 even after as much as 72 to 96 hours molten history. Furthermore, it has been possible to recover a much larger heartcut of dimethyl terephthalate in the final distillation step (which usually but not necessarily follows the purification procedure disclosed herein), exhibiting an acceptable initial acid-number and an acceptable acid-number stability; for example, in the distillation of purified dimethyl terephthalate, heartcut yields in the 85% range are possible, compared to prior yields of about 75%.

The increase in heartcut size is made possible by a decrease in the size of the forecut necessary to produce a satisfactory initial acid-number. In addition to the improvement in product quality and yield, the process also has other desirable features, particularly simplicity, flexibility and inexpensiveness.

The invention may be best illustrated and its advantages demonstrated in comparison to the purification of esters in the absence of noble metal contacting by reference to the examples hereinafter presented. In these examples a crude dimethyl terephthalate contaminated with acidic constituents and connate acid-forming impurities was contacted by various methods and with varying amounts of contacting agent, varying contact times and temperatures, etc. The sample thus contacted was then distilled according to the following procedure. The distillation of the ester was carried out at a pressure of 80 mm. pressure with a 4 hour equilibration period at total reflux. A first cut, 2.5% by weight of charge, was taken at 10/1 reflux ratio. The second cut, 5% of charge, was also taken at 10/1 reflux ratio. Cuts 3 and 4, each 5% of the charge, were taken at a 5/1 reflux ratio. The rest of the distillation was accomplished at a reflux ratio of 1/1. Cuts 6–12 were each 7.5% of the charge, and cuts 5, 13, 14, 15 and 16, were each 5% of the charge weight. The pot temperature was about 205° C. The acid-number of each cut resulting from the distillation was determined and a heartcut composited containing all cuts with an acid-number below 0.04.

In some of the examples the contacting operation was carried out prior to distillation by percolating the impure molten ester through a porous bed of the contacting agent and in some of the examples the contacting was accomplished by introducing the contacting agent into the bottom of the distillation column. For all examples a control sample of the same contaminated ester was subjected to the same distillation procedure as described above but with the omission of any contacting treatment. The heartcut samples were then maintained in the molten state at 150° C. under an inert gas blanket containing 0.5% oxygen. Periodically aliquot portions of heartcut samples were withdrawn and their acid-number determined. The data obtained are set forth in the following examples along with a description of the variables investigated.

*Runs 1–3*

Runs 1–3 demonstrate the improvement in acid-number stability using various concentrations of palladium supported on activated charcoal. The runs were conducted by dispersing the palladium supported on charcoal in molten dimethyl terephthalate in a distillation column, using a weight ratio of ester to contacting agent (palladium plus charcoal) of 46. The palladium was supported on 4–8 mesh carbon in the concentrations listed in Table I. The contacting was done for four hours at total reflux at an absolute pressure of 80 millimeters of mercury, at a temperature of about 200° C. The acid number of the ester was considerably improved by the process.

TABLE I

| Run No. | Percent Pd | Acid Number (times 1,000) After— | | | | |
|---|---|---|---|---|---|---|
| | | 0 hr. | 24 hr. | 48 hr. | 72 hr. | 84 hr. |
| 1 | 0.1 | | 40 | 42 | 43 | |
| 2 | 0.2 | 0 | 41 | 53 | | 53 |
| 3 | 0.5 | 10 | 42 | 41 | 46 | |
| Control | | 13 | 29 | 123 | 279 | 284 |

*Runs 4–5*

These runs show the effectiveness of the purification process by percolation through a fixed bed of contacting agent. Dimethyl terephthalate was percolated through a fixed bed comprising 0.22% palladium supported on 4–8 mesh carbon at a temperature of 150° C. and atmospheric pressure.

TABLE II

| Run | Space Velocity [1] | Acid Number (times 1,000) After— | | | |
|---|---|---|---|---|---|
| | | 0 hr. | 24 hr. | 48 hr. | 84 hr. |
| 4 | 1 | 3 | 47 | 44 | 44 |
| 5 | 2.4 | 10 | 67 | 68 | 68 |
| Control | | 13 | 133 | 278 | 284 |

[1] Pounds of ester per minute per pound of contacting agent.

*Run 6*

The procedure described above for Runs 1–3 was repeated, except that the contacting agent comprised 0.3% palladium on a substantially anhydrous calcined alumina. The acid numbers for the purified ester at 0, 24, 48 and 72 hours were 0.003, 0.009, 0.011, and 0.016, respectively. A control run gave acid numbers for the same time periods of 0.15, 0.218, 0.364, and 0.440, respectively.

*Runs 7–9*

Runs 7–9 illustrate the effectiveness of ruthenium and rhodium in the purification of dimethyl terephthalate. These runs were conducted as described for Runs 1–3, except that the contacting agent comprised 5% of the particular noble metal, in each case supported on powdered carbon, and the weight ratio of ester to contacting agent was 100.

TABLE III

| Run | Metal | Acid Number (times 1,000) After— | | | |
|---|---|---|---|---|---|
| | | 0 hr. | 24 hr. | 48 hr. | 72 hr. |
| 7 | Palladium | 10 | 7 | 6 | 15 |
| 8 | Ruthenium | 03 | 9 | 17 | 25 |
| 9 | Rhodium | 10 | 22 | 22 | 21 |
| Control | | 15 | 218 | 346 | 440 |

*Runs 10–12*

Runs 10–12 demonstrate the improved yield of ester from the esterification process and the long effective life of the noble metal contacting agent. Samples of crude dimethyl terephthalate were percolated at 150° C. through a fixed porous bed of 0.2% palladium on 4–8 mesh carbon, using a space velocity of 1.0 pounds of ester per minute per pound of contacting agent. Periodically samples of the contacted ester were withdrawn to test the effectiveness of the contacting agent after various total throughputs.

The samples were then distilled according to the procedure hereinbefore described. The initial acid-number of each cut was determined. The results are set out in Table IV.

TABLE IV

| Cut No. | Acid Number (times 1,000) | | | | |
|---|---|---|---|---|---|
| | Run 10 | Run 11 | C–1 | Run 12 | C–2 |
| 1 | 314 | 162 | 142 | 314 | 140 |
| 2 | 102 | 100 | 67 | 143 | 53 |
| 3 | 26 | 42 | 48 | 29 | 70 |
| 4 | 18 | 28 | 41 | 17 | 27 |
| 5 | 3 | 13 | 27 | 9 | 32 |
| 6 | 3 | 9 | 21 | 8 | 10 |
| 7 | 3 | 7 | 16 | 8 | 11 |
| 8 | 3 | 5 | 15 | 8 | 14 |
| 9 | 3 | 4 | 13 | 8 | 28 |
| 10 | 3 | 3 | 21 | 8 | 5 |
| 11 | 3 | 3 | 7 | 8 | 3 |
| 12 | 3 | 3 | 7 | 8 | 1 |
| 13 | 3 | 4 | 7 | 8 | 1 |
| 14 | 3 | 4 | 10 | 8 | 2 |
| 15 | 3 | 11 | 12 | 19 | 6 |
| Cum'l. Charge [1] | 133 | 467 | | 600 | |

[1] Total throughput in pounds of ester per pound of contacting agent. (C–1 and C–2 in Tables IV–VI refer respectively to the Control Runs for Runs 10–11, and Run 12.)

A heartcut composite containing all cuts having an acid-number (times 1,000) below 45 was made for each run and each control. Table V shows the heartcut yield for each run and each control in relation to the rejected fraction.

TABLE V

| Fraction | Purified DMT, Wt. Percent of Charge | | | | |
|---|---|---|---|---|---|
| | Run 10 | Run 11 | C–1 | Run 12 | C–2 |
| Forecut | 7.2 | 8.3 | 13.1 | 7.6 | 12.0 |
| Heartcut | 81.7 | 81.8 | 77.1 | 84.7 | 79.9 |
| Still Bottoms | 8.9 | 8.9 | 6.4 | 4.6 | 5.2 |
| Weight Balance, Percent DMT recovered | 97.8 | 99.0 | 96.6 | 96.9 | 98.1 |

Acid-number stability tests of the heartcut samples were then made to determine the effect of increasing the amount of DMT treated per pound of contacting agent. The data obtained are shown in Table VI.

TABLE VI

| Runs | Acid Number (times 1,000) After— | | | | |
|---|---|---|---|---|---|
| | 0 hr. | 24 hr. | 48 hr. | 72 hr. | 96 hr. |
| 10 | 7 | 46 | 60 | 60 | |
| 11 | 12 | 10 | 20 | 16 | |
| C-1 | 15 | 71 | 138 | 168 | |
| 12 | 11 | 23 | 22 | 32 | 24 |
| C-2 | 18 | 56 | 144 | 146 | |

Run 13 shows that the use of alumina without any noble metal is ineffective to increase the acid-number stability of DMT. The run was conducted as described for Runs 1-3. The acid number increased from 0.001 initially to 0.146 at 24 hours and 0.294 for 48 hours. A control run wherein no alumina was used yielded a product in which the initial acid number of 0.013 rose to 0.133 at 24 hours and 0.278 at 48 hours.

The process of this invention is also applicable to purifying lower alkanol esters of the benzene tri- and tetracarboxylic acids, such as trimesic, trimellitic, and pyromellitic acid.

Having described the invention, what is claimed is:

1. A process for purifying a lower alkanol ester of a phthalic acid contaminated with acidic constituents and connate acid-forming impurities which comprises contacting said ester in the liquid state with a Group VIII noble metal as sole purifying agent and separating said ester from said noble metal.

2. The process of claim 1 wherein said noble metal is dispersed upon a solid support.

3. A process for purifying which comprises contacting dimethyl esters of phthalic acids contaminated with acidic constituents and connate acid-forming impurities in the liquid state with a Group VIII noble metal as sole purifying agent and separating said esters from said noble metal.

4. The process of claim 3 wherein the said ester is dimethyl terephthalate.

5. The process of claim 4 wherein the said dimethyl terephthalate is in the molten state.

6. The process of claim 3 wherein the said noble metal is palladium.

7. The process of claim 3 wherein the said noble metal is ruthenium.

8. The process of claim 3 wherein the said noble metal is rhodium.

9. The process of claim 3 wherein the said noble metal is on a solid porous support.

10. The process of claim 9 wherein the said solid support is activated carbon.

11. The process of claim 9 wherein the said solid support is gamma-type alumina.

References Cited

UNITED STATES PATENTS 3,058,997  10/1962  Taylor et al. _____ 260—525

LORRAINE A. WEINBERGER, *Primary Examiner.*

THOMAS L. GALLOWAY, JR., *Assistant Examiner.*